(12) United States Patent
Räsänen et al.

(10) Patent No.: US 9,079,978 B2
(45) Date of Patent: Jul. 14, 2015

(54) TREATMENT OF FIBRES TO ENDURE PROCESSING

(75) Inventors: Jari Räsänen, Imatra (FI); Tapani Penttinen, Huutjärvi (FI); Ali Harlin, Kerava (FI); Jaakko Hiltunen, Kauniainen (FI); Hanne Wikberg, Espoo (FI); Tekla Tammelin, Karkkila (FI)

(73) Assignee: STORA ENSO OYJ, Helsinki (FI)

( * ) Notice: Subject to any disclaimer, the term of this patent is extended or adjusted under 35 U.S.C. 154(b) by 185 days.

(21) Appl. No.: 13/257,435

(22) PCT Filed: Mar. 18, 2010

(86) PCT No.: PCT/FI2010/050212
§ 371 (c)(1),
(2), (4) Date: Jan. 3, 2012

(87) PCT Pub. No.: WO2010/106234
PCT Pub. Date: Sep. 23, 2010

(65) Prior Publication Data
US 2012/0097352 A1    Apr. 26, 2012

(30) Foreign Application Priority Data

Mar. 20, 2009   (FI) ..................................... 20095291

(51) Int. Cl.
| D21H 11/20 | (2006.01) |
| C08B 3/20 | (2006.01) |
| C08B 3/14 | (2006.01) |
| D21H 17/14 | (2006.01) |
| D21H 21/14 | (2006.01) |
| D21H 27/10 | (2006.01) |

(52) U.S. Cl.
CPC ... C08B 3/20 (2013.01); C08B 3/14 (2013.01); D21H 11/20 (2013.01); D21H 17/14 (2013.01); D21H 21/14 (2013.01); D21H 27/10 (2013.01)

(58) Field of Classification Search
CPC ....... D21H 11/20; D21H 17/14; D21H 17/15; D21H 11/16; D21H 27/10; D21H 21/14; C06B 3/14; C06B 3/20
USPC ....................... 162/9, 157.6–157.7, 182, 184; 536/56–58, 63–65, 75; 8/115.51, 8/115.7, 116.1, 120
See application file for complete search history.

(56) References Cited

U.S. PATENT DOCUMENTS

| 1,936,586 | A | * | 11/1933 | Dreyfus | 536/69 |
| 2,330,263 | A | * | 9/1943 | Broderick | 536/66 |
| 2,692,183 | A | | 10/1954 | Ericks | |
| 2,715,065 | A | * | 8/1955 | Hatcher | 162/167 |
| 2,957,746 | A | * | 10/1960 | Buck, Jr. et al. | 8/129 |
| 3,125,405 | A | * | 3/1964 | Gardon | 8/184 |
| 3,441,367 | A | * | 4/1969 | Frick, Jr. et al. | 8/183 |
| 3,671,184 | A | * | 6/1972 | Cuculo | 8/120 |
| 3,854,869 | A | * | 12/1974 | Yanai | 8/116.4 |
| 5,549,791 | A | * | 8/1996 | Herron et al. | 162/157.6 |
| 5,755,828 | A | * | 5/1998 | Westland | 8/185 |
| 6,184,271 | B1 | | 2/2001 | Westland et al. | |
| 6,916,402 | B2 | * | 7/2005 | Shannon et al. | 162/9 |
| 7,144,474 | B1 | * | 12/2006 | Hansen et al. | 162/12 |
| 2003/0121623 | A1 | * | 7/2003 | Westland et al. | 162/9 |
| 2003/0155087 | A1 | * | 8/2003 | Sears et al. | 162/9 |
| 2005/0072542 | A1 | * | 4/2005 | Sears et al. | 162/184 |
| 2006/0118255 | A1 | * | 6/2006 | Sears et al. | 162/9 |
| 2009/0118452 | A1 | * | 5/2009 | Seppala | 527/400 |
| 2012/0097352 | A1 | * | 4/2012 | Rasanen et al. | 162/157.6 |
| 2012/0160433 | A1 | * | 6/2012 | Vehvilainen et al. | 162/24 |

FOREIGN PATENT DOCUMENTS

| GB | 2 360 794 A | 10/2001 |
| WO | WO 02/084024 A1 | 10/2002 |
| WO | WO 2006/068611 A1 | 6/2006 |
| WO | WO 2007/017553 A1 | 2/2007 |
| WO | WO 2009080891 A1 * | 7/2009 | ............ B65D 77/20 |
| WO | WO 2010106234 A1 * | 9/2010 | |

OTHER PUBLICATIONS

Finnish Search Report, dated Nov. 19, 2009, issued in corresponding Finnish Patent Application No. 20095291.
Lonnberg et al. "Grafting of Cellulose Fibers with Poly(ε-caprolactone) and Poly (L-lactid acid) via Ring-Opening Polymerization." Biomacromolecules 2006, 7, 2178-2185.
Lonnberg et al. "Surface grafting of microfibrillated cellulose with poly (ε-caprolactone)—Synthesis and characterization." European Polymer Journal 44 (2008), 2991-2997.
International Preliminary Report on Patentability issued Sep. 29, 2011, in PCT International Application No. PCT/FI2010/050212.
Written Opinion issued Jun. 29, 2010, in PCT International Application No. PCT/FI2010/050212.
Extended European Search Report for corresponding Application No. 10753173.3 dated Oct. 25, 2013.

\* cited by examiner

*Primary Examiner* — Jose Fortuna

(74) *Attorney, Agent, or Firm* — Birch, Stewart, Kolasch & Birch, LLP

(57) ABSTRACT

The invention relates to a method of treating chemical pulp fibers by a polymerizing hydroxy acid, the fibers thus obtained and the products refined from them. In the method, the hydroxy acid reacts with the reactive groups of the fibers in the presence of a catalyst, forming ester bonds. The following units of the same hydroxy acid are oligomerized and/or polymerized to these grafted acid residues. The fibers thus treated and the products refined thereof endure better processing stages that include drawing and stretching than untreated fibers.

12 Claims, 5 Drawing Sheets

TREATMENT OF FIBRES TO ENDURE PROCESSING

FIELD OF THE INVENTION

The present invention belongs to the field of packaging materials, particularly rigid packages that are based on cellulose fibres. Methods of treating fibres or a fibrous web are described in more detail according to some embodiments, so that the board composite to be manufactured as a product endures treatment in a softened state and stiffens into a shape, selecting the suitable conditions. The object also comprises the board products thus obtained.

PRIOR ART

Products based on cellulose fibre are used daily in various applications. The most common of these include writing and printing papers, board, paper towels and soft tissue, as well as nonwoven products. The manufacturing methods of cellulose fibre products: the mechanical, mechanochemical or chemical defibration, detach the fibres so that they can be suspended in a carrier, typically water, with suitable additives and formed into a web by a paper machine. Appropriate additives are selected to achieve the desired properties.

The preferred strength properties of cellulose fibres are also used to strengthen the materials that are to be thermo-moulded. In the structure, polymer (e.g., polyolefin) forms a continuous matrix, which the fibres strengthen. These composites or composite materials are manufactured and described extensively in literature. One problem in combining, e.g., oil-based polymer and lignocellulose fibres is that the former is hydrophobic and the latter hydrophilic. US application 20070164468A1 relates to a method, by which the surface properties of a lignocellulose material are modified to enhance the weak adhesion between the hydrophobic polymer and the hydrophilic fibre matrix in composite products. The modification of surface properties can be carried out chemically, e.g., with poly(L-lactic acid) or enzymatically (with laccase). The composite product can be processed by any known methods of polymer technology, such as injection moulding.

Another example of the manufacture of a composite of lignocellulosic fibres and thermoplastic is publication WO2007/056839, which describes a fibre/thermoplastic plastic composite comprising pulp-based lignocellulosic fibres and normal thermoplastic; polypropylene, to be more exact. In the multiphase method of manufacturing the composite, lignocellulosic fibres are first defibrated mechanically to separate the inner hydrogen bonds and to form microfibers on the surface of the fibres. Then, the lignocellulosic fibres are dispersed throughout in the molten thermoplastic to achieve an interaction between the surfaces between the said components.

U.S. Pat. No. 6,187,136 relates to the manufacturing of a modified lignocellulosic material. In the method, on the one hand, the lignocellulosic material and, on the other hand, a phenolic carboxylic acid or a salt thereof, are brought into an oxidation reaction with an oxidizing agent (ferulic acid) in the presence of an enzyme (laccase), and the reaction products thus obtained are allowed to react together. The surface charge of the modified lignocellulosic material is increased, whereby a suitably charged reinforcing material, such as cationic starch, can be added to the material to increase the strength of the paper product.

Efforts have been made to convert natural polymers, such as starch derivatives, which are rigid and inelastic by nature, into plastic-like materials by blending with, e.g., polycaprolactone. However, softeners should then be used, e.g., glyceryl derivatives, such as triacetin, alkyl citrates or the like. The manufacture of such materials is described in publication EP0663936 B1.

The U.S. Pat. No. 2,692,183 deals with the improvement of fibre stability by chemically modifying the wall structure of the fibre, which through an increase in the fibre stiffness results in the improvement of the product properties, e.g., in a humid environment. Other solutions of this type are also known, which are used, e.g., for decreasing the tendency of textiles to crease by cross-linking. U.S. Pat. No. 2,692,183 deals diversely with various chemical means of treating the wall structure of the fibre, in particular. However, the said specification does not deal with the modification of fibres so as to influence the interaction between the fibres.

The scientific publications from Lönnberg et al. European Polymer Journal, 44 (2008) pages 2991-2997 and Biomacromolecules 7, (2006) pages 2178-2185, describe the improvement of the dispersing ability of the nano or microfibrillated cellulose thus obtained in a non-polar solvent with the intention to form a composite between cellulose and plastic, wherein the compatibility of phases is improved by modifying the hydrophobicity of the fibre surface. The fibre modification is carried out by in-situ ring-opening polymerization on the surface of the fibre in the water-free solvent. Typically, the ring-opening polymerization comprises grafting from a reactive spot. The starting point of grafting used comprises xyloglucan (XET Technology). Using a water-free environment is necessary for the ring-opening polymerization.

The publications that represent the prior art are characterised by mechanically or chemically detaching the fibres from each other and using the separate fibres as additives to reinforce the continuous polymeric matrix. However, there is still a need to develop a method of influencing the fibre properties so that they would momentarily endure strenuous forming; however, still retaining their nature of a polysaccharide fibre type. On the other hand, there is also a need to develop a method, where the grafting can be carried out in an environment, in which the requirement for water-free environment is not crucial. Furthermore, there is a need to develop a method, wherein grafting is carried out to the fibre, i.e., a monomer or its oligomer is capable of directly bonding to the surface of the cellulose-bearing fibre.

GENERAL DESCRIPTION OF THE INVENTION

The invention relates to the forming of fibres and formed fibres, which as raw materials can open up improved possibilities and freedom of design for wood and cellulose-based fibre-based materials in various applications, such as in the field of packaging.

Surprisingly, the inventors have discovered that by reacting with hydroxyl groups hydroxy acids soften cellulose-based fibres and the agglomerates formed by the fibres, or the formed fibrous webs, by opening the hydrogen bonds between the fibres and reacting to the hydroxyl groups thus released or other free hydroxyl groups. In the reaction, acid is grafted to the fibres with an ester bond. The hydroxy acid treatment softens the fibres, in practice, enabling forming that includes twisting and stretching in some applications. The thermoplastic properties of the fibres and the fibrous material are increased.

The inventors have also discovered that fibres, which are grafted with hydroxy acid, can be further strengthened by esterification, i.e., by covalently bonding to them more monomer and/or oligomer units. The structure is also strengthened by the reactions, which take place between the hydroxy acid derivatives that comprise the side chains of different fibres and which can thus crosslink the chains to each other. The reactions are heat-triggered but it is also advantageous to catalyze them. The free hydroxy acid can react simultaneously esterifying to the fibres and the mono, oligo or polymers of hydroxy acid that are already attached to the fibres. The use of a catalyst accelerates the reaction, so that the slow esterification to the fibres, which can be considered a disadvantage, is not a limiting factor.

It has also been discovered that hydroxy acids can be directly added to the fibres that are formed into a web, whereby the strength of the web preferably decreases temporarily when the hydrogen bonds between the fibres open. The softened web is easier to form mechanically than before the treatment. When the added hydroxy acid is further polymerized, a strong web is again obtained.

1. To be precise, the method according to the present invention is characterized in that, it is a method of processing fibres containing cellulose, including:
    (i) treating said fibres with hydroxy acid for softening the fibres and bonding the acid groups to the OH groups of the fibres by an ester bond;
    (ii) enhancing the reaction of hydroxy acid by a catalyst, so that the hydroxy acid is bonded to the hydroxy acid monomers and/or oligomers that are esterified to the fibre.

The method produces fibres, to which the mono, oligo and polymers of hydroxy acid are grafted. The fibres thus treated are characterized by an ester peak observable in a FTIR spectrum. Similarly, a corresponding ester peak can be observed in the FTIR spectrum defined for the fibre of the web obtained by the method according to the invention. When the treated fibres, web or sheets are used as raw material, paper or board is obtained, which contains at least 50% of fibres that contain cellulosic and hemicellulosic polymers, and at least 10% of hydroxy acid derivative that is covalently bonded to the fibre, whereby there is an ester peak in the FTIR spectrum of the fibre within the range of about 1730-1740 $cm^{-1}$.

The embodiments of the present invention provide significant advantages. When the reaction time is long and the conversion high, the hydrophobicity that is increased along with the elongated hydroxy acid chains makes it possible to form compound materials with other hydrophobic substances. According to another embodiment, by adjusting the method properties, the conversion of the grafting and the polymerization of the hydroxy acid can be controlled, so that the treated fibres can be formed into a web and manufactured into paper, so that the fibres form a continuous matrix, which has improved properties due to the treatment according to the invention. On the other hand, the selection of the fibrous material can be used to control the properties and applications of the product thus obtained. Furthermore, the web formed according to the present invention has improved strength properties. The possibilities to form the same are more versatile due to the improved plasticity.

An advantage of the invention is also the high availability and renewability of wood-based raw materials.

One advantage of the end product is its biodegradability and friendliness to the environment, which are achieved by selecting the hydroxy acid from among biodegradable acids.

A further advantage is that the softener and the substituent to be grafted consist of the same hydroxy acid or its derivative. The oligomers and polymers of the hydroxy acid are soluble in the said hydroxy acid.

DESCRIPTION OF THE FIGURES

The invention is illustrated by means of the following figures, wherein.

DETAILED DESCRIPTION OF THE INVENTION

Figure 1A:
FIG. 1 shows a SEM image enlargement of the appearance of an unwashed (1a) fibre and one washed (1b) with acetone and water, treated according to the invention. The figure shows that in the treatment, hydroxy acid is grafted to the fibre, which when oligomerized and/or polymerized is expressed as increased smoothness and plasticity (the crystallinity seems to be lower). In particular, the figure shows that when the material that is weakly bound to the fibre (globules and roughness in FIG. 1a) is removed in connection with washing, the remaining oligomer and/or polymer are/is covalently bonded to the fibre. The scale down right is 20 um.

The present invention discloses a method of manufacturing a paper or board product, wherein chemical pulp fibres are modified by treating them with hydroxy acid.

It is known that acid treatment shortens chemical pulp fibres, which generally is an unwanted reaction leading to the loss of strength properties typical of crystalline cellulose. Therefore, acids are not typically used for softening plant polysaccharides, but solvents known as softeners, such as triethyl citrate.

In the method of processing fibres comprising at least cellulosic polymers, preferably also hemicellulosic polymers:
    (i) said fibres are treated with an aliphatic polymerisable hydroxy acid for softening the fibres and bonding the acid groups to the OH groups of the fibres by an ester bond;
    (ii) the reaction of the hydroxy acid is intensified by a catalyst, so that some hydroxy acid is bonded to the hydroxy acid monomers and/or oligomers that are esterified to the fibre.

Fibres

In the method, fibres containing cellulose are treated. In this context, the fibre containing cellulose preferably refers to a pulp fibre that comprises at least cellulose, i.e., polysaccharide that consists of β-D-glucose. Typically, plant fibres comprise cellulosic and hemicellulosic polymers. Depending on the source of fibres, it may thus also contain hemicellulosic polymers and, in some starting materials, also lignin. Industrially useful fibres include wood and herb-based pulp fibres; in addition to the known wood-based fibres, also fibres obtained, e.g., from cotton, linen, hemp, bagasse, jute or the like.

The fibres contain cellulose in a crystalline or amorphous form. Bonding of the side groups of crystalline cellulose to each other between β-D-glucose chains makes the structure dense, networked by hydrogen bonds. The properties provided by this structure, strength, among others, are desired properties, which are preferably preserved. Consequently, the processes, which the fibres are subjected to, are preferably designed so as not to weaken the crystalline cellulose. The amorphous cellulose, instead, contains less hydrogen bonds between the chains, whereby some side groups of the glucose units of the polymer, i.e., —OH groups, remain free to react with other reagents. Corresponding free —OH groups and sterically approachable in the structure, can also be found in the hemicellulose of the fibres. Bonding of the hydroxy acids by ester bonds to the —OH groups of the hemicellulose chains of the fibres is preferable, as this binds the hemicellulose better to the fibre, thus enhancing the strength.

For the invention, it is thus essential that the fibre contains free hydroxyl groups. According to an embodiment, a sufficient number of hydroxyl groups can be obtained on the surface of the cellulose fibre by pretreating the fibres. The leading principles in the pretreatments comprise facilitating the mass transfer and increasing the reactive specific surface, which contribute to the reactions. As alternative methods of treating the fibre surface, the following could be mentioned, among others: adding a material containing plenty of hydroxyl groups onto the surface, chemically or enzymatically swelling the fibres and breaking the surface mechanically. One way of adding hydroxyl groups is to adsorb an excess of hemicellulose onto the surfaces of the fibres. Hemicelluloses that have a strong positive affinity towards cellulose, e.g., galactoglucomannans, are particularly suitable. Another way is to swell the fibres by either using enzymes or chemicals, e.g. the use of cellobiohydrolase. A said third way can be implemented, e.g., by using ultrasound to break the hydrogen bonds of the hydroxyl groups.

These methods can also have an effect on the length of the fibres. On the other hand, the fibre length can also be adjusted separately so as to be appropriate. It is obvious to those skilled in the art that, depending on the application, different fibre lengths serve different processes and end uses.

The exemplifying part describes tests according to an embodiment, wherein the fiber length is not treated. The fibres have essentially the length of unbroken fibres. Such long, hydrophilic fibres according to the invention, which contain only a small amount of grafted hydroxy acid or a derivative thereof, can be formed into a web by any conventional means known in the field. The amount of fibre is larger than that of the polymer that is esterified thereto. Due to the said treatment, the fibres that are treated according to the invention have improved moulding properties compared with untreated fibres. Alternatively, the paper or board already formed can be impregnated with hydroxy acid or, optionally, derivatives thereof to provide a corresponding effect. Such a material can be moulded, when in a softened state, and hardened with heat, a catalyst or a combined effect thereof, when the desired form is achieved.

According to another embodiment, the fibres that are to be treated with hydroxy acid are ground, e.g., by means of so-called Wiley grinding, whereby the length of the fibre is about 0.2-0.5 mm. When treating such a raw material, higher reactivity and better conversion are obtained in the method, due to the higher density of hydroxyl groups in the fibres. The fibre/polymer ratio is lower with respect to the previous embodiment, i.e., the treated, nearly full-length fibres.

According to an embodiment, the mechanical treatment can yield nanofibrils, the length of which is up to dozens of micrometers. The diameters of the nanofibrils can be from 5 nm to 1 μm.

According to a further embodiment, the fibres are pretreated, so that the fibrous material has a length of 70 nm-1 μm and a diameter of about 20 nanometers on an average. The density of the hydroxyl groups and the resulting reactivity are extremely high. When treating such a fibre according to the invention, a ductile plastic material is achieved which, due to the fibres, however, has a better strength than the most common pure polymers do.

Depending on the source, the cellulose of this size category in the field is referred to as nanocellulose, cellulose nanofibres, whiskers or microfibril, microfibrillated or nanofibril cellulose. For releasing cellulose fibrils from the source materials, several methods have been published, which can roughly be characterized as chemical delignification, mechanical diminution, chemical diminution and dissolution. They can be use separately or in combinations. Hubbe et al., have drawn up a summary about the isolation methods of nanofibrils. Instead of wood, many researchers have used, as starting material, a partly or fully purified wood derivative, such as microcrystalline cellulose (MCC) or bleached pulp, from which the majority of lignin and a considerable part of hemicellulose have been removed.

Subramanian et al. have described process alternatives. Dissolving cellulose in solvents and its reformation, even electrospinning into a fibril, are considered industrially interesting. The removal of amorphous portions by acid hydrolysis has also been applied to the manufacture of microcrystalline cellulose. Enzymatic or microbiologic decomposition as such or together with mechanical grinding are well-known treating methods. Microfibrils have also been separated from sugar cane and the tuberous root cells of potato. According to Subramanian, the effect of raw material and treatment on the properties of the microfibrils are not fully known.

The emphasized examples of fibre lengths mentioned above illustrate the effect of the fibre length on the properties of the material obtained by the method. Those skilled in the art understand that when combinations of the said fibre lengths or the fibre lengths that remain between the said examples are selected, this is still included in the scope of the method according to the invention.

Hydroxy Acid

Hydroxy acid refers to any natural or synthetic carboxylic acid which, in addition to the hydroxyl group included in the acid group, also comprises at least one other hydroxyl group. According to where the said second hydroxyl group is situated in the carbon chain with respect to the acid group, reference is made to α-hydroxy acids, β-hydroxy acids and so on, wherein α suggests that the hydroxyl group is situated immediately in the carbon adjacent to the acid group, β refers to the second carbon from the acid group, etc. In the method according to the invention, the α-hydroxy acids are preferable because of their reactivity.

The hydroxy acids (hydroxycarboxylic acids) preferably correspond to the general formula:

$$\text{HO—}(C_nH_{2n})\text{-COOH} \qquad (1)$$

wherein n is an integer number 1-7, more preferably 1, 2 or 3, especially preferably 2.

Such acids include glycolic acid (n=1), lactic acid (n=2 and wherein the hydroxyl group is in the alpha position), hydroxybutyric acid or hydroxyisobutyric acid (n=3), hydroxyvaleric acid (n=4), each one of them having the hydroxyl group attached to the last carbon.

The said hydroxy acids can react under preferable conditions, whereby monomer units are bonded together by ester bonds, forming oligomers and/or polymers, in other words; polyesters. It has been observed to be especially advantageous for the method that the hydroxy acids can be grafted to the fibre and the monomers be bonded to each other under conditions, where water is present. In an embodiment, the hydroxy acid may contain water up to 4-5 w-%, e.g., as a result of distillation. Surprisingly, it was possible to implement grafting under conditions, where the dry matter content was about 5 w-% of the total amount of the reaction solution.

It is well-known in the art to manufacture linear polyesters from these hydroxycarboxylic acids.

In some embodiments, it is preferable for the hydroxy acid to be essentially water-free. Water is a product of condensation polymerization, its presence transferring the balance towards the starting materials.

Many of these hydroxycarboxylic acids are known to form cyclic esters, i.e., lactones, which are advantageous in the manufacture of corresponding polymers. In the reactions of lactones, water-free conditions are necessary, as even a minor amount of water destroys the lactone used therein.

A particularly preferable hydroxy acid to be used in the applications of the paper industry comprises lactic acid, since it is abundantly available and the polylactate (PLA) obtained from it is a well-known and acknowledged biodegradable polymer. Products that contain the same are also accepted and certified bioproducts in various parts of the world. The properties, manufacture and decomposition of polylactates, e.g., in composts have also been studied widely.

In the method according to the invention, the grafting can be carried out simply by hydroxy acid. Monomers are then attached to the hydroxyl groups of the fibre, other monomers further reacting with them and lengthening thus into oligomer or polymer chains. In industrial applications, this procedure requires a relatively long reaction time.

In addition to the hydroxy acid, the reaction preferably also comprises the oligomers and/or polymers that are formed from the monomers of the same hydroxy acid. The oligomers and polymers are soluble in hydroxy acid.

Catalyst

The catalyst used in the grafting and/or polymerization reaction of hydroxy acid can preferably be selected from bivalent cations, such as $Sn^{2+}$, $Zn2+$, $Mg2+$, or trivalent ones, such as $Al3+$, $Y3+$, $Ga3+$, or quadrivalent cations $Ti4+$, $Zr4+$, $Ge4+$. Alternatively, the catalysts can be selected from strong acids or among borates or boron acids. If the reactions are catalyzed by tin derivatives, such as $SnCl_2$ or tin laureate, the catalyst is fed into the system by means of a solvent, such as methanol.

In an embodiment, where the hydroxy acid is lactic acid, all polymerization catalysts of the lactic acid are active, such as the industrially used tin octoate $Sn(Oct)_2$, metal alkoxides, such as isopropylates $Al(O\text{-}iPr)_3$, $Y(O\text{-}iPr)_3$, and triphthalates $Al(OTf)_3$, as well as the rare earth metal complexes Sc, In or the Cu, Ag and Mg complexes of metals.

Reaction Temperature

The polymerization reaction can be enhanced using a raised temperature. The stage b) of the method according to the invention is preferably carried out at a temperature of 120-210° C. and more preferably at 120-160° C.

Alternative Methods of Treating Separate Fibres with Hydroxy Acid

In an embodiment, fibres are treated with hydroxy acid as pulp. The pulp may be a raw material of paper that is manufactured chemically, mechanically or by combining these methods and defibrated by methods known by those skilled in the art. Separate fibres are suspended in hydroxy acid. The hydroxy acid may contain water or it may be water-free.

It has been proven experimentally that both pulps that contain lignin and lignin-free pulps are suitable for the starting materials of the method. The presence of lignin in the fibres offers a preferable fibre surface environment for specific enzymatic and chemical reactions. In some applications, the presence of lignin may be harmful, e.g., because of the brightness property requirements made of the product. It has been proven experimentally that lactic acid can be grafted at least to pine and birch cellulose and the CTMP pulp of spruce.

The lignin in the fibre structure tends to activate in thermal processing steps, whereby the lignin may migrate out of the material, resulting in problems with odours, surface quality and the usability of the process equipment. Hydroxy acid monomers soften the lignin further. When using oligomeric and polymeric hydroxy acids (the embodiment comprising prepolymerization), this problem has not been observed.

The conversion of hydroxy acid to the fibre can be adjusted by influencing the reaction conditions. It has been proven experimentally that the reaction time, density of the pulp and prepolymerization of the hydroxy acid influence the conversion and the physical properties of the product thereby obtained. By selecting the conditions, the length, thickness and hydrophilicity of the fibres thus obtained can be influenced.

Fibres with suitable properties according to the invention can thus be customized to different applications.

According to an embodiment, the fibres that are handled as bulk are dispersed in an excess of lactic acid. The effects of the density of dispersion are studied in the experimental part. When the lactic acid has reacted with the cellulose and/or hemicellulose, the lactic acid/lactic acid polymer is washed out of the fibre.

According to another embodiment, the fibres are dispersed in lactic acid, which also contains the catalyst. In this way, an about 5-percent dispersion is achieved. The excess of lactic acid is first sucked and then pressed from the fibres to achieve an approximately equal ratio of the amounts of fibre and lactic acid. The removed lactic acid minor flow can be reused in the process, when dispersing new fibres.

Reactions in Water

According to a further embodiment, lactic acid and catalyst are added to wet pulp (dry matter content of about 5%). The catalyst should be permanent in the water environment. To advance the reaction, it may be necessary to use high temperatures and/or a phase transfer catalyst.

Gas-Phase Polymerization

According to an embodiment, gaseous lactic acid reacts with the fibre surfaces. In this embodiment, both wet and dry fibres can work as substrates.

Utilization of Oligomeric Hydroxy Acid

In order to accelerate the performance of the grafting phase and decrease the above-mentioned softening of lignin, it is preferable to use oligomeric hydroxy acids. Then, the hydroxy acid monomers are first oligomerized separately, which also reduces their acidity. This phase is referred to as preoligomerization or prepolymerization. The decreased acidity weakens the ability of the reagent to open hydrogen bonds, but also prevents undesired hydrolyzation of the fibres. After adding the oligomer, the reaction is continued in the manner described above.

Alternative Methods of Treating with Hydroxyl Acid Fibres that have been Formed into a Web In a preferred embodiment, lactic acid is impregnated into a cellulose fibre web, whereby the hydrogen bonds open and the fibres swell. When the process is carried out at a raised temperature, the lactic acid is grafted to the fibres bound to the web, without separating the fibres from each other.

In a preferred embodiment, in a deep drawn soft web that contains cellulose grafted with lactic acid, and free lactic acid, the lactic acid can further be reacted by influencing the conditions. In that case, bonds are formed between the grafted fibres by esterification and the residual acid reacts with the pendant groups of different fibres, forming bonds between the same. Bonds between the fibres stiffen the material. When the material thus obtained is shaped before stiffening, the shape remains without returning, e.g., to the form preceding the deep drawing. Examples of conditions, by which the stiffening reaction can be started and advanced, include raising the temperature and using a catalyst.

Lactic acid is capable of softening a various selection of fibrous webs, but specific paper glues, particularly alkyl ketene dimers, limit the power of the reaction through their extensive and durable bonding with the fibrous web.

Softening one side of a coated board is considerably quicker and simpler than softening both sides of a coated material. The consumption of lactic acid is quicker and more effective at a raised temperature.

Lactic acid does not detach the printing of the coated board. It has been proven that also printed packing board can be moulded. However, the coatings do not limit the strengthening process.

In some embodiments, the pulp is formed into a web in a manner typical of the paper manufacture and the treatment according to the invention is directed to this intermediate product, the dry content (DS) of which at the moment of acid treatment can be within 0.01-99 w-%. One special case comprises implementing the treatment by impregnation on a finished or nearly finished paper or board, coated or uncoated, whereby the dry content may be quite high, 90-99 w-%. Lactic acid and the catalyst added thereto are impregnated into the fibrous web that is formed earlier and at least partially dried. The reaction time can be shortened by using dry pressing for the hardening.

In the following, the invention is illustrated by examples, which should not be construed as limiting its scope, however.

EXAMPLES

To illustrate the invention, experiments were conducted. The following examples describe the treatment of fibres on a laboratory scale and a pilot scale, and the treatment of a fibrous matrix, which is formed into a sheet, with hydroxycarboxyl acid.

Example 1

Treatment of Fibres on a Laboratory Scale

Dehydration of Lactic Acid

For the laboratory scale reactions, (160-190 g, 80%) D,L-lactic acid (technical grade lactic acid=LA) was used, containing 20% of water. Excess water had to be removed from the lactic acid before the reactions. The dehydration of lactic acid was carried out in a vacuum at a temperature, which was at least 140° C., stirring constantly.

Grafting of Lactic Acid to Fibres/Prepolymerization

After dehydration, catalyst (tin octoate 0.5 w/w-%) and dry pulp (10-40 g) were added into a 1 l reactor. In the reactor, lactic acid was grafted to the fibres of the pulp. In addition, monomers were bonded by a chain-extending reaction to the mono or oligomers that were already attached to the fibre. This was verified by IR spectra and SEM images for fibres, from which the fractions not attached to the fibre had been removed by the extractions and washings described in the following.

Treatment of Pulp after the Reactions

The reaction mixture was extracted with acetone, the solution was filtered and the filtrate was recycled through the pulp cake. This was repeated twice, whereafter two more aqueous extractions followed. The lactic acid that did not react at the washing stage and its derivatives (the fractions that were oligomerized and polymerized, but not attached to the fibres) and the hydrolyzed mono and oligo saccharides were removed from the fibres. The washed pulp was broken up into small particles and dried in an oven at 105° C.

Analyses

Figure 1B:
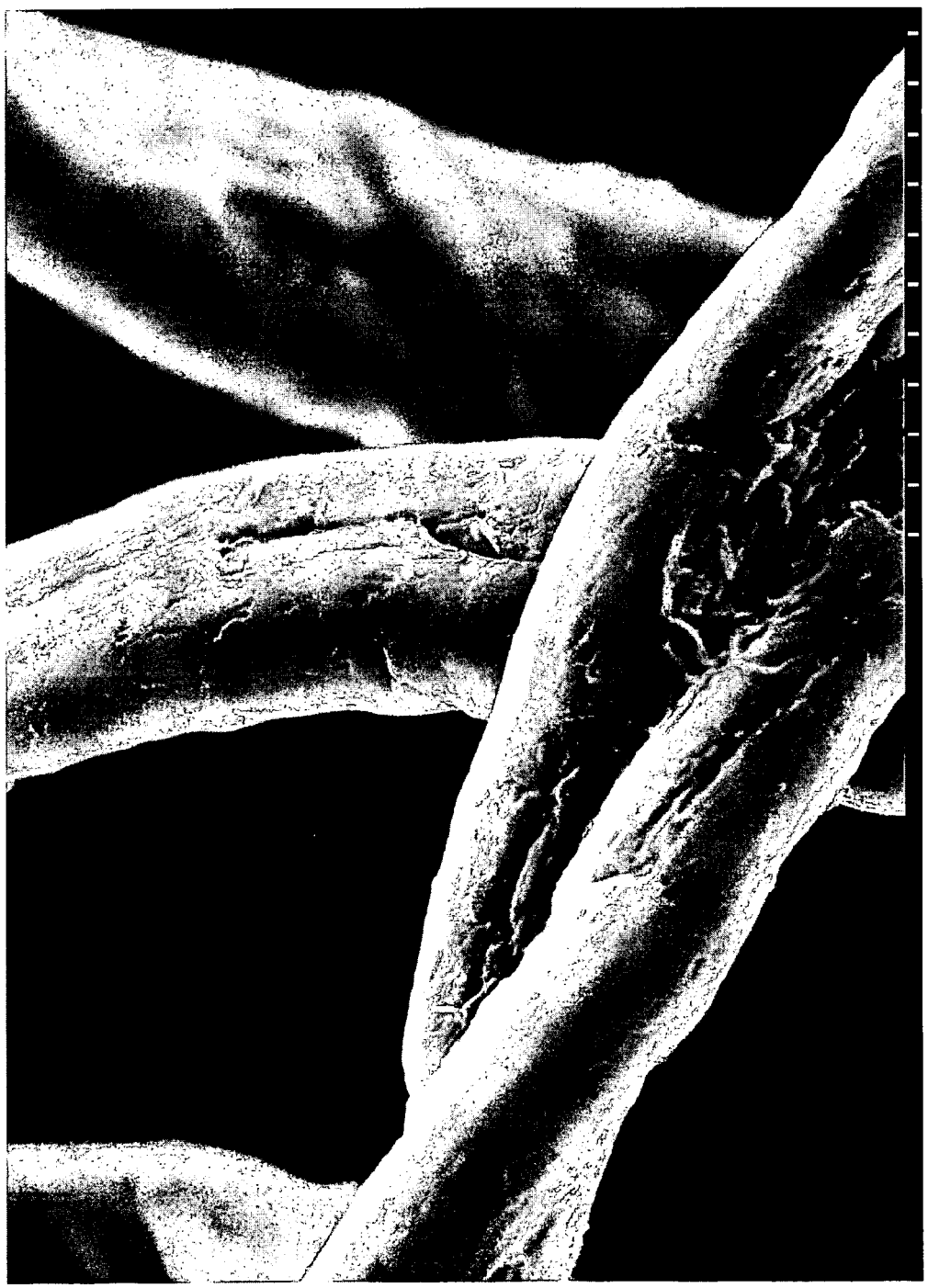

Analyses were conducted for the dried fibre by running FTIR spectra, in which the presence of an ester peak is detected at about 1736-1737 $cm^{-1}$. Quantitative conclusions can also be drawn from the spectra, e.g., concerning the amount of lactic acid attached to the fibre. The changes caused by the reaction were also examined by SEM images, in which smoothening of the surface between the treated unwashed and washed fibre in the presence of polymer can be observed, as well as the effective removal of any weakly bound substance in the washing (FIG. 1).

By means of the laboratory scale tests, it was proven that the reaction worked in the samples tested. The variables examined in the laboratory comprised various types of fibres: Wiley-ground kraft pulp, cold-dried kraft pulp of birch, and spruce CTMP; and the effects of the reaction time (within 1-10 h), density of the pulp (5-20%) and prepolymerization of the lactic acid. Thus, the laboratory-scale tests yielded sufficient basics for the pilot-scale test arrangements.

Regarding the pulp density, the results indicated that an increase in the density results in shortening and thickening of the fibres treated by the method. When long fibres are to be obtained, it is thus preferable to carry out the reaction at a low density of, e.g., 5%. When the goal is to obtain short and thick fibres, a higher density of, e.g., 15% is preferable.

Figure 2:
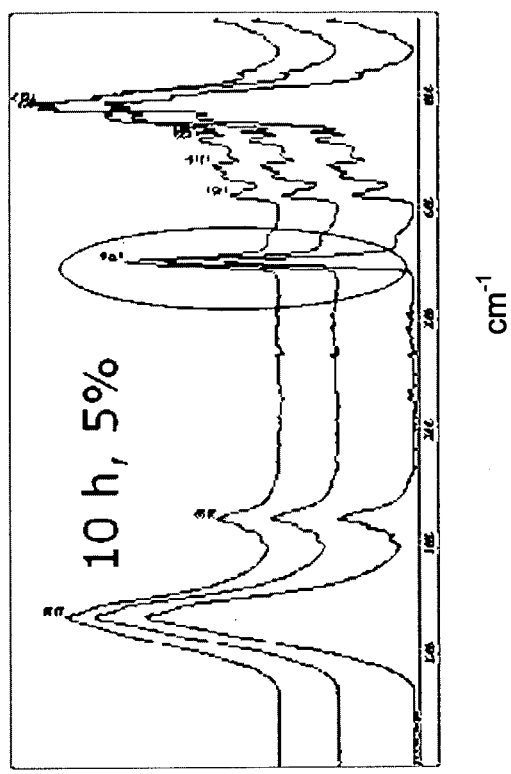
FIG. 2 shows the FTIR spectra for the time dependence of the conversion of the reaction conducted on pulp that is freeze-dried at a density of 5% for reaction times of one and ten hours. For a longer reaction time, an increased ester peak is obtained. The scale down right is 20 um.
Figure 2:
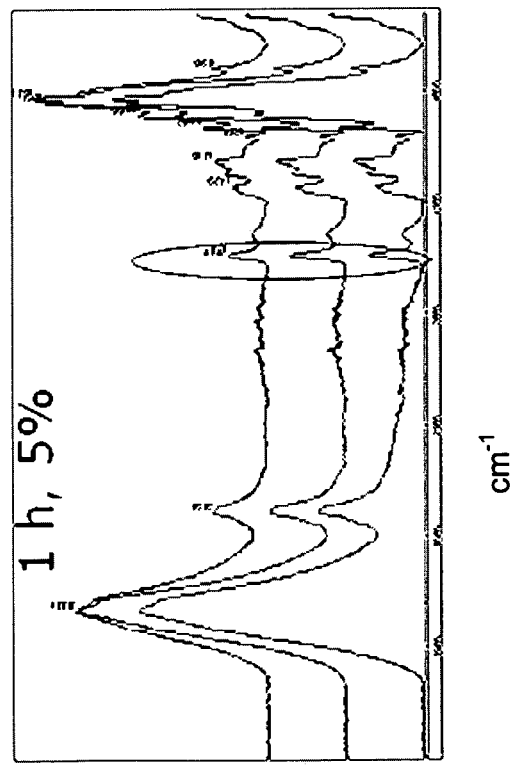

The effect of the reaction time on the proceeding of the reaction was considerable. When comparing the size of the ester peak, e.g., between a 1-hour reaction and a 10-h reaction (FIG. 2), it can be observed that there are considerably more ester bonds present in the 10-h sample than in the 1-h sample.

Figure 3:
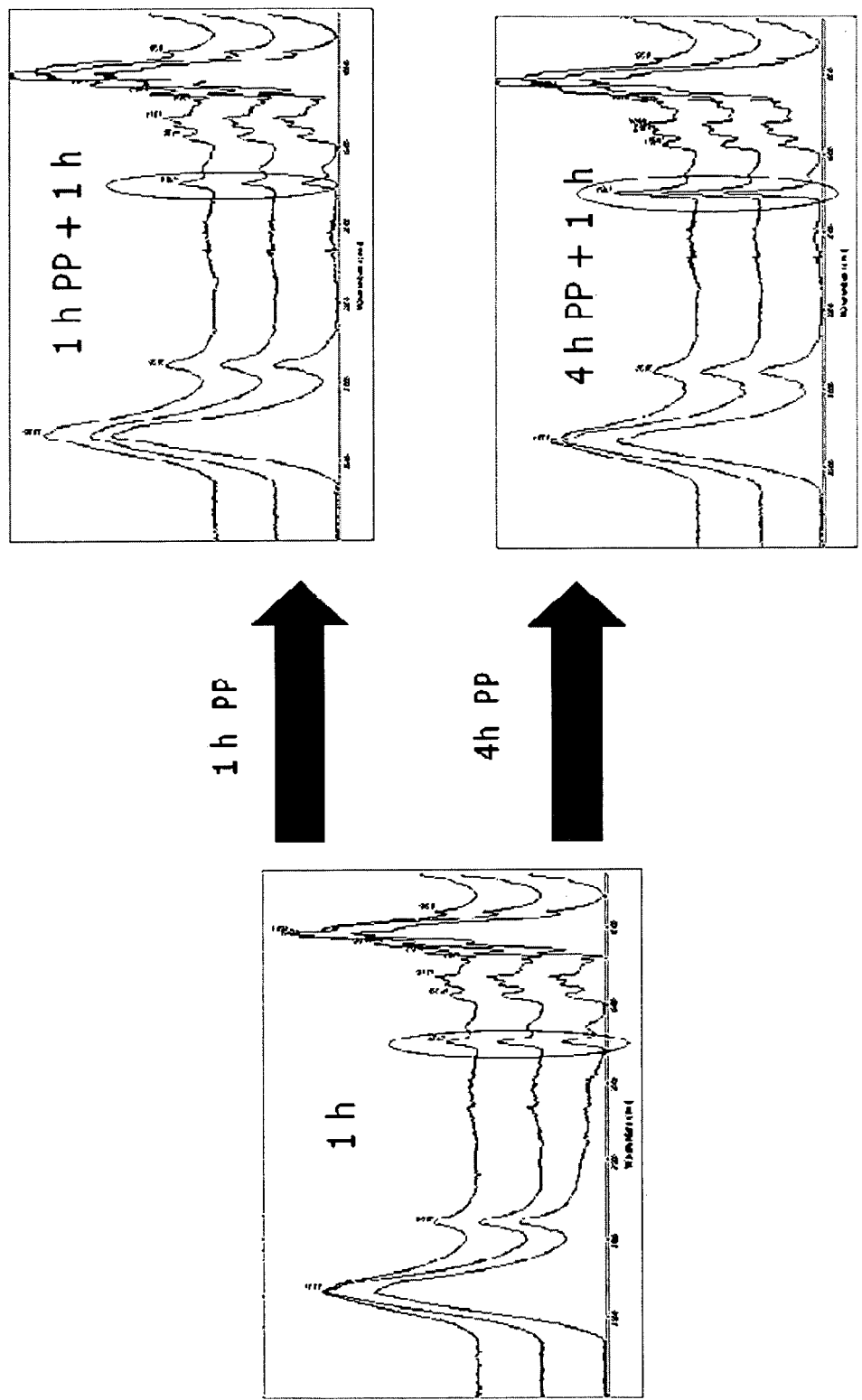
FIG. 3 shows the effect of prepolymerization, observed by FTIR, on the number of ester bonds for samples that are prepolymerized for 0 h, 1 h and 4 h. Otherwise, the reaction conditions were kept constant, the only variable thus being the prepolymerization. Surprisingly, also the prepolymerized hydroxy acid oligomers were grafted to the fibres in the presence of acid. Prepolymerisation (PP) for 1 h was not effective, whereas prepolymerisation for 4 h was highly effective. The peak at 1730-40 $cm^{-1}$ is circled.

The effect of prepolymerization can be examined in FIG. 3, in each one of which the reaction between the pulp and lactic acid is standardized to last for 1 hour, but the prepolymerization takes 0 h, 1 h and 4 h. On the basis of these samples, it could be concluded that prepolymerization increases the number of ester bonds. Without binding ourselves to any theories, the test results indicate that in the reaction according to the invention, the slowest stage is the chaining of the monomers or oligomers of hydroxy acid to each other. The grafting reaction between the fibre and the monomer or oligomer of hydroxy acid seems to take place easier and not to limit the reaction speed.

Example 2

Treatment of Fibres on a Pilot Scale

Pretreatment of Fibre 10 kg of industrial (Stora-Enso) cellulose sheets were dispersed in water into a 6% fibre suspension in a 200-liter DRAIS reactor for 30 minutes, the temperature being about 20° C. During the dispersion of the fibres, the slurry was stirred intensively by the clod crusher of the reactor. Thereafter, the fibres were filtered apart from the suspension by using a bag filter and overpressure, whereby about 20% pulp was obtained. The entire pulp was transferred to the DRAIS reactor and dried for 60 minutes in a vacuum (of at least 0.2 bar) within a temperature range of 60-100° C.

Figure 4:
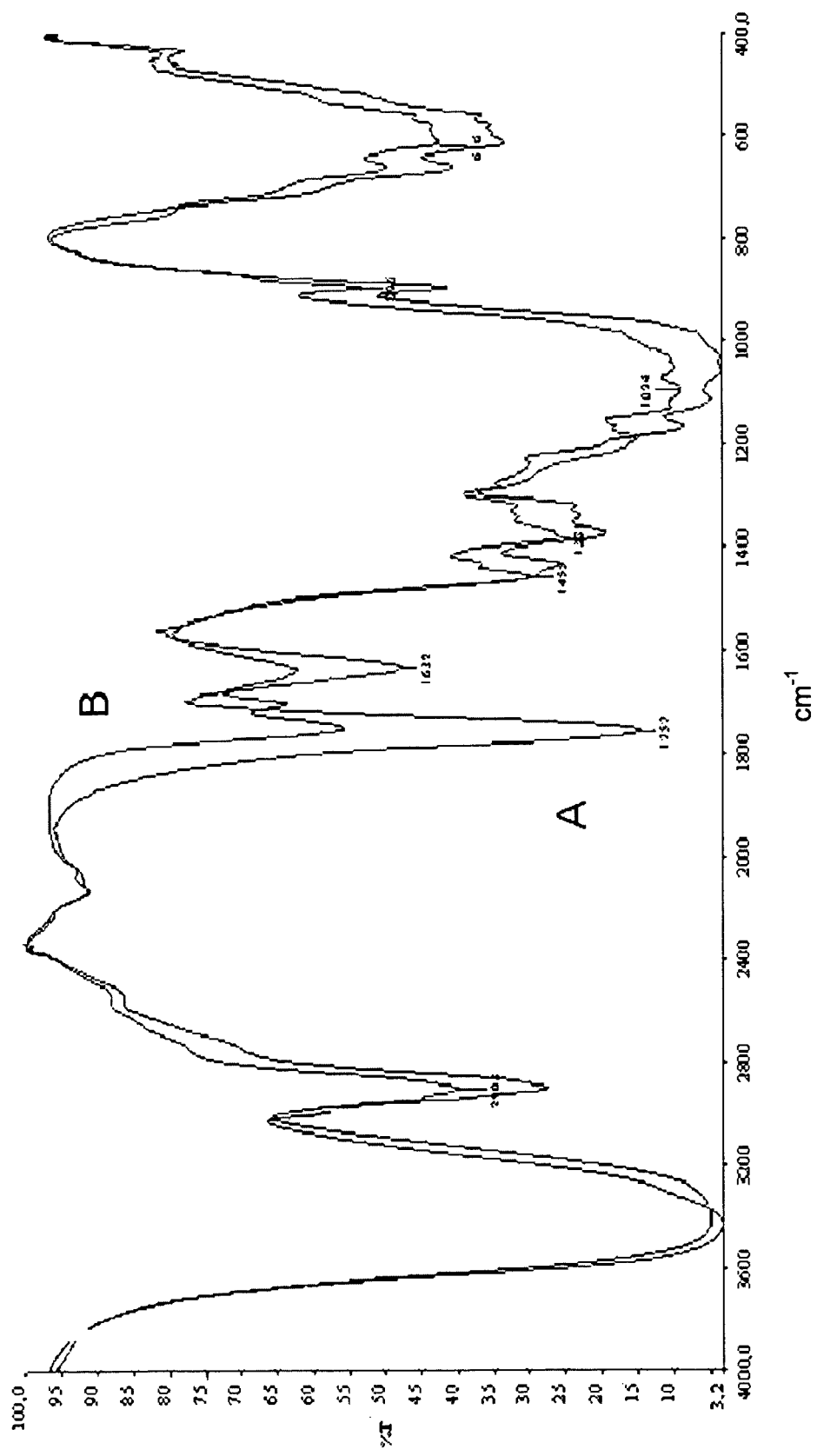
FIG. 4 shows the FTIR graphs of samples obtained from pilot-scale tests, wherein a sample was taken from the fibres treated by the method according to the invention before (A) the extraction and purification stages and after the same (B). The figure indicates that acid and/or its derivatives are bonded to the fibres and an ester peak is detectable, when reagent residues are washed from the sample.

Reaction Phase 15 kg of 80% (Purac, technical LA) lactic acid were loaded into a 100-liter DRAIS reactor, and water was removed from the acid by means of under pressure (60-100° C.) within an hour. Thereafter, 75.0 g of tin octanoate were added into the reactor as the polymerization catalyst. The temperature of the reaction mixture was raised to 140° C. and a 6-h polymerization stage was carried out in the vacuum. As a result, in the reactor there was a viscous, slightly brownish liquid poly (lactic acid) oligomer, into which the fibres were fed gradually. At the feeding stage of fibre, it could be observed that the prepolymerized lactic acid in the reactor was very well mixed with the fibres at the temperature of 140° C. Consequently, it was possible to carry out the poly(lactic acid) grafting stage of the fibre immediately at a reaction time of 2 h, in the vacuum and at the reaction temperature mentioned above. After the reaction time had passed, it could be observed that the reactor was full of fibrous material, the total yield of which was 13.7 kg. The 10 g sample taken from the fibre was purified by extracting with 200 ml of acetone, filtering and rinsing the fibre one more time on the filter with acetone, after which the sample was dried. The chemical reaction with the poly(lactic acid) could be detected from the FTIR spectrum of the purified fibre, comprising an absorption of 1734-1750 cm$^{-1}$ typical of the ester (FIG. 4).

Table 1 contains the summary of the tests conducted in the treatment of separate fibres to study the effect of the reaction time, density, prepolymerization and the origin of the pulp.

TABLE 1

Test points in the tests according to Examples 1 and 2.

| Origin of the pulp | Density, (%) | Prepolymerization, (h) | Reaction time, (h) |
|---|---|---|---|
| Kraft pulp of birch, Wiley-ground | 5 | — | 1 |
| | 10 | — | 1 |
| | 15 | — | 1 |
| | 20 | — | 1 |
| | 50 | — | 1 |
| | 20 | 6 | 2 |
| Kraft pulp of birch, Freeze-dried | 5 | — | 1 |
| | 5 | — | 10 |
| | 5 | 1 | 1 |
| | 5 | 1 | 10 |
| | 5 | 4 | 1 |
| | 10 | 1 | 1 |
| Bruce, CTMP | 5 | — | 1 |
| Kraft pulp of pine | 5 | — | 1 |
| | 5 | — | 4 |
| | 5 | — | 6 |

Example 3

Treatment of Sheets on a Laboratory Scale

Example 3.1

Two-Phase Reaction, Softening of the Sheet 2.4 g of 90% lactic acid were added to a weighed birch cellulose sheet of 1.6 g. The sample was heated at 125° C. for 120 minutes. As a result, a softened cellulose sheet was obtained, its mass 2.2 g referring that 0.6 g of lactic acid was grafted to the fibres. The conversion is thus 25%.

Example 3.1

Two-Phase Reaction, Hardening of the Sheet

As the catalyst of the reaction, 0.4 ml of 0.01 M $SnCl_2$ methanol solution were added to the sheet that was obtained as a product of Example 1. The sample was heated at 210° C. for 10 minutes. The strength of the sample increased and the formed sheet hardened. The reaction caused a colour change on the surface, onto which the catalyst solution was added.

Example 3.2

One-Phase Reaction 2.4 g of 90% lactic acid and 0.4 ml of 0.01 M $SnCl_2$ methanol solution were added to the weighed birch cellulose sheet of 1.6 g. The sample was heated at 125° C. for 120 minutes. The formed sheet hardened and a considerable colour change was observed throughout the sample.

Example 3.3

One-Phase Reaction without the Catalyst, 155° C.

2.4 g of 90% lactic acid were added to the weighed birch cellulose sheet of 1.6 g. The sample was heated at 155° C. for 120 minutes. As a result, a white softened cellulose sheet was obtained, its mass 2.4 g referring that 0.8 g of lactic acid was grafted to the fibres. The conversion was thus 34%. The formed sheet was hardened and it was pale yellowish white.

Example 3.4

One-Phase Reaction, the Catalyst+155° C.

2.4 g of 90% lactic acid and 0.4 ml of 0.01 M $SnCl_2$ methanol solution were added to the weighed birch cellulose sheet of 1.6 g. The sample was heated at 155° C. for 120 minutes. As a result, a white softened cellulose sheet was obtained, its mass 2.6 g referring that 1.0 g of lactic acid was grafted to the fibres. The conversion was thus 42%. The formed sheet was hardened considerably and it was dark.

Example 3.5

Coated and Printed Packing Board; Two-Phase Reaction

A packing board that was coated and printed on one side thereof was moistened with the aqueous solution of lactic acid on its uncoated side. The sample was kept at 120° C. for 30 minutes, whereby it softened. The softened board was formed by an adjustable round steel mould. When the forming was finished, the fibrous layer and its surface were undamaged and formed according to the mould. The formed sample was placed at 200° C. for 5 minutes. The conversion of lactic acid was about 18% compared with the original amount. The formed sample kept its shape when hardening.

REFERENCES

Hubbe et al. Cellulosic nanocomposites: review. BioResources 3(3), 929-980, 2008.

Subramanian R. et al. Structure and properties of some natural cellulosic fibrils. BioResources 3(1), 2008, 192-203.

The invention claimed is:

1. A method of processing pulp fibres containing cellulose, comprising:
   (i) treating said fibres with (a) hydroxy acid monomers selected from the group consisting of lactic acid, glycolic acid, or mixtures thereof and/or with (b) oligomers of hydroxy acid monomers selected from the group consisting of lactic acid, glycolic acid, or mixtures thereof, for softening the fibres and bonding the acid groups to the OH groups of the fibres by an ester bond, wherein said treatment results in said hydroxy acid monomers and/or oligomers of said hydroxy acid monomers being esterified to the fibres; and
   (ii) enhancing the reaction by treating the fibres of (i) in the presence of lactic acid or glycolic acid monomers and/or oligomers with a catalyst, so that lactic acid or glycolic acid is bonded to the hydroxy acid monomers and/or oligomers that are esterified to the fibres,
      wherein said fibres are treated with said hydroxy acid monomers and/or oligomers in a reaction system consisting essentially of said fibres, lactic acid or glycolic acid monomers and/or oligomers, said catalyst, and optionally water.

2. A method according to claim 1, wherein the hydroxy acid is lactic acid.

3. A method according to claim 1, wherein to enhance the stage (ii), heating at a temperature of 120-210° C. is also used.

4. A method according to claim 1, wherein the catalyst is bivalent cations $Sn^{2+}$, $Zn^{2+}$, $Mg^{2+}$, trivalent cations $Al^{3+}$, $Y^{3+}$, $Ga^{3+}$, quadrivalent cations $Ti^{4+}$, $Zr^{4+}$, $Ge^{4+}$, or strong acids.

5. A method according to claim 1, wherein before the stage (i), the number of hydroxyl groups on the surface of the fibre is increased by pretreatment, said pretreatment being selected from the group consisting of chemical swelling of fibres, enzymatic swelling of fibres, mechanical degradation, and adsorption of a hemicellulose excess onto the surface of the fibres.

6. A method according to claim 1, wherein before the stage (i), a web is formed from said fibres, which is brought into contact with hydroxy acid.

7. A method according to claim 1, wherein the hydroxy acid is essentially water-free.

8. A method according to claim 1, wherein to enhance the stage (ii), heating at a temperature of 120-160° C., is also used.

9. The method of claim 1, wherein in
   (i) said fibres are treated with said hydroxy acids monomers and/or oligomers for a period of 0.5 to 10 hours and, subsequently
   (ii) the reaction is enhanced by treating the fibres of (i) with a catalyst.

10. The method of claim 1, wherein the pulp fibres containing cellulose are lignin-free.

11. The method of processing cellulose pulp fibers of claim 1, wherein water is present in the reaction system.

12. The method of processing cellulose pulp fibers of claim 11, wherein up to 5% water is present in the reaction system.

* * * * *